Nov. 3, 1959          H. B. DAVIS          2,910,998

ANTI-CORROSIVE VALVE HAVING A RUBBER SPRING

Filed Jan. 15, 1957

INVENTOR
HERBERT B. DAVIS

BY *Cushman, Darby & Cushman*
ATTORNEYS

United States Patent Office 2,910,998
Patented Nov. 3, 1959

2,910,998

ANTI-CORROSIVE VALVE HAVING A RUBBER SPRING

Herbert B. Davis, Columbia, S.C.

Application January 15, 1957, Serial No. 634,363

6 Claims. (Cl. 137—375)

This invention relates to improvements in valve construction and more particularly to an improved valve construction for use with materials which are corrosive to metals, such as acids, ammonium nitrate solutions, ammonium nitrate urea solutions, ammonium nitrate anhydrous ammonia water solutions and the like, including volatile gases having corrosive characteristics.

The present invention constitutes an improvement over the valve construction disclosed in my copending application, Serial No. 527,677, filed August 11, 1955, of which this application is a continuation-in-part, now Patent Number 2,853,097. In that application, there is disclosed a corrosive resistant valve construction which includes a valve chamber formed by corrosive resistant interior surfaces and having a corrosive resistant valve member mounted therein for movement toward and away from an inlet valve seat formed therein. The end of the chamber opposite from the valve seat is apertured to receive a valve stem which extends outwardly therefrom for engagement with suitable spring means or the like for resiliently urging the valve member into engagement with the valve seat. For the purpose of protecting the valve stem from contact with any corrosive material during the operation of the valve, a resiliently deformable member is disposed in the valve chamber in engagement with the valve member and the interior walls of the chamber so as to provide a seal therebetween and also to resiliently urge the valve member into engagement with its seat.

While this arrangement has proven quite successful in operation, it has been found that the resiliently deformable member in close proximity to the valve stem may sometimes become deformed into tight engagement with the valve stem as the valve member moves away from its valve seat, thus inhibiting this movement by a binding action.

Accordingly, it is an object of the present invention to provide a valve construction of the type described having improved means for preventing the resiliently deformable member from coming into contact with the valve stem, thus eliminating the problem of binding noted above.

Another problem encountered in the operation of the valve described in my copending application relates to the leakage of the corrosive material in the valve, or volatile gases therefrom, between the resiliently deformable member and the valve member when the latter is closed as a result of the breaking down of the vulcanization, or for other reasons. This leakage permits contact of corrosive materials with the valve stem and materially shortens the life of the valve construction.

Accordingly, it is a further object of the present invention to provide a valve construction of the type described having improved means completely isolating the valve stem from contact with the corrosive materials in the valve construction.

Still another object of the present invention is the provision of a valve construction which is capable of handling corrosive materials for an extended period of time without deterioration and which is simple in operation and economical to manufacture and maintain.

These and other objects of the present invention will become more apparent during the course of the following detailed description and appended claims.

The invention may best be understood with reference to the accompanying drawings in which an illustrative embodiment is shown.

Figure 1:
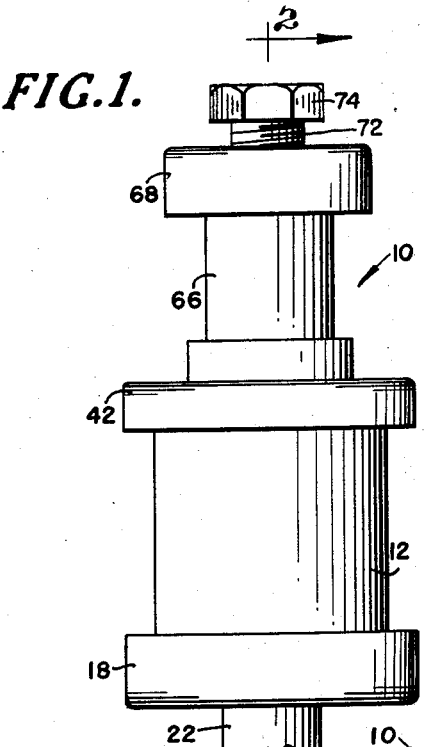
Figure 1 is an elevational view of a valve construction embodying the principles of the present invention.
Figure 2:
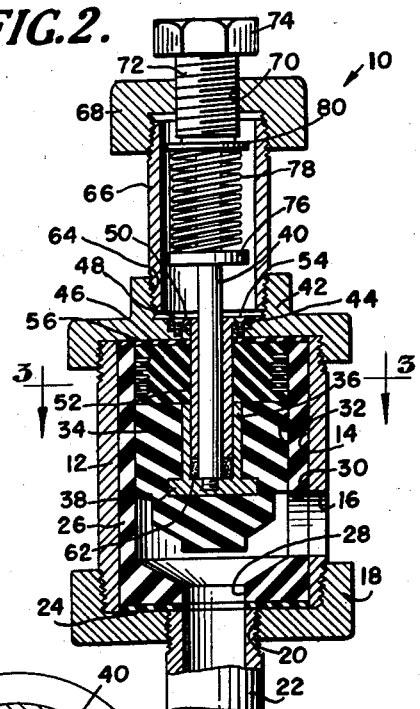
Figure 2 is a cross-sectional view taken along the line 2—2 of Figure 1.
Figure 3:
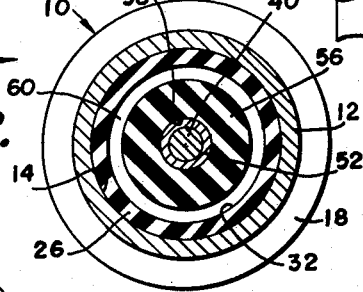
Figure 3 is a cross-sectional view taken along the line 3—3 of Figure 2.

Referring now more particularly to the drawings, there is shown in Figures 1–3 a valve construction, generally indicated at 10, which embodies the principles of the present invention. The valve 10 includes a tubular body section 12 which may be made of a suitable metal or the like. The tubular body section 12 defines a cylindrical cavity 14 having open ends and an outlet opening 16 extending transversely therefrom. The lower end of the body section 12 is threaded to receive an end plate 18 having a central threaded opening 20 formed therein. As best shown in Figure 2, a suitable inlet pipe 22 may be threaded into the opening 20 to connect the valve into the system where it is to be utilized.

Disposed within the lower portion of the cavity 14 in engagement with the interior surface of the end plate 18 is a gasket 24 and a cup-shaped insert 26 is mounted within the cavity 14 in engagement with the gasket 24. As best shown in Figure 2, the insert 26 includes an end wall apertured as at 28 so as to define an inlet and an annular valve seat surrounding the inlet. The insert 26 also includes a peripheral wall extending from the end wall, the peripheral wall being apertured, as at 30, to provide an outlet aligned with the outlet aperture 16 of the body section 12. The interior surface of the insert defines a valve chamber 32 within which a valve member 34 is mounted for sliding movement. The valve member 34, as well as the insert 26, may be made of any suitable corrosive resistant material, such as rubber, plastic or the like.

Embedded within the valve member 34 is a sleeve or tube 36 which extends from the central portion thereof longitudinally outwardly therefrom in a direction away from the valve seat. An end wall 38 is formed on the inner end of the tube 36 for threaded receiving the lower end of a valve stem 40 which extends upwardly through the valve chamber.

The upper end of the valve body section 12 is exteriorly threaded to receive an end plate 42 having a central aperture 44 formed therein through which the valve stem 40 extends. A gasket 46, preferably of hard rubber or the like, is mounted in engagement with the end plate 42 so as to abut the adjacent end of the insert 26. The end plate 42 includes a first counterbore 48 for receiving a peripheral flange 50 formed on the upper end of a sleeve or tube 52 which extends inwardly of the valve chamber 32 in telescopic relation with respect to the tube 36. The tube 52 has its flange 50 secured to the end plate by any suitable means, such as screws 54 or the like and is arranged to slidably receive the valve stem 40.

Figure 4:
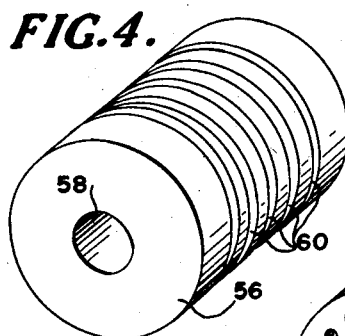
Figure 4 is an enlarged perspective view of the resiliently deformable member of the valve construction.

Mounted within the valve chamber between the gasket 46 and the valve member 34 is a resiliently deformable member 56. This member may be constructed of any suitable material but preferably is made of a material possessing both corrosive resistant and resilient characteristics. For example, the resiliently deformable member may be made of solid rubber or of foam rubber or other resilient materials, such as plastic or the like. As best shown in Figure 4, the member 56 is cylindrical in form having an opening 58 extending longitudinally therethrough for receiving the tube 52. The peripheral surface of the cylinder member has a plurality of annular grooves 60 formed therein which serve to provide space into which the member may be deformed when the valve member is moved away from its valve seat.

Preferably, the surface of the member 56 which engages the valve member 34 is vulcanized or otherwise cemented thereto so as to provide a fluid-tight seal therebetween. However, as a precautionary measure in the event that such seal should break down, a sleeve 62 of resiliently deformable material is disposed within the tube 36 between the end wall 38 thereof and the adjacent end of the tube 52. The sleeve 62 is preferably constructed of foam rubber which is capable of being deformed into a volume considerably less than it occupies when in its relaxed state.

The end plate 42 is provided with a second counterbore 64 which is interiorly threaded to receive the lower end of a pipe section or tubular member 66. The upper end of the member 66 is exteriorly threaded to receive a cap element 68 having a central opening 70 extending therethrough. Threadedly mounted within the opening 70 is a hollow threaded section 72 having a headed upper end 74 formed so as to receive a turning tool, such as a wrench or the like. The threaded section 72 is of hollow construction so as to receive the upper end of the valve stem 40 and permit longitudinal movement thereof. Suitably secured to the central portion of the valve stem 40 is a collar 76 which receives the lower end of a coil spring 78 disposed in surrounding relation to the valve stem. A washer 80 loosely mounted on the upper end of the valve stem engages the upper end of the coil spring and is resiliently urged into engagement with the lower end of the hollow threaded section 72.

In operation, the valve construction 10 is particularly useful in systems arranged to handle corrosive materials. The valve construction is particularly adapted to be utilized as a safety relief valve in railroad tank cars employed to carry corrosive resistant materials. It will be noted that the resiliently deformable member 56 and the coil spring 78 both serve to bias the valve member 34 into engagement with the valve seat 28 so as to maintain the valve construction in a closed position. The spring pressure exerted by the coil spring 78 may be varied by turning the hollow threaded section 72 by means of the head 74. In the event that the pressure within the inlet pipe 22 exceeds a predetermined value, the valve member will be moved away from its seat permitting escape of the fluid through the outlets 16 and 30. When the excessive pressure condition has been alleviated, the valve member 34 will return to its closed position under the action of the member 56 and the spring 78.

One feature of the present construction is the ease with which the same can be assembled. The tubular body section 12 may be made up of a section of conventional pipe and the end plate 18 threaded on one end thereof. The gasket 24 is then inserted through the upper end of the body section and then the insert 26 is mounted in the cavity 14 on top of the gasket. Of course, the openings 16 and 30 should be aligned after the insert is properly positioned within the cavity and in this regard, it will be understood that additional outlet openings may be provided, if desirable. Next, the valve member 34, with the stem 40 secured to the tube end wall 38, is positioned within the valve chamber 32 provided by the insert. It is noted that the resiliently deformable member 56 may either be vulcanized to the valve member before insertion of the latter or suitably cemented thereto after its insertion. The end wall 42 is threadedly mounted on the upper end of the body section 12 after having positioned the hard rubber gasket 46 within the chamber.

In this regard, the resiliently deformable member 56 is such that when the end wall 42 is threaded onto the upper end of the body section a slight initial deformation is caused to occur therein which insures a good resilient engagement of the same with the interior walls of the valve chamber 32 and with the gasket 46. Next, the rubber sleeve 62 and the tube 52 are inserted through the resiliently deformable member 56 and end wall opening 44. Screws 54 are tightened through the flange 48 to retain the tube 52 in fixed position with respect to the tubular body section 12. Next, the tubular member 56 is threaded in the counterbore 64 and the cap 68 threaded on the upper end thereof. After the coil spring and washer 80 have been mounted in surrounding relation with the valve stem 40, the hollow threaded section 72 is engaged within the aperture 70 within the cap 68 to complete the construction. It will be understood that the valve may be readily disassembled by reversing the above procedure for purposes of repair or replacement of parts.

Another, more important feature of the present invention relates to the provision of the tube 52 within the valve chamber 32 in surrounding relation to the valve stem 40 so that the member 56 will be deformed into engagement with the tube rather than the stem 40. The tube 52 is fixed with respect to the valve body and, hence, when the valve member is moved away from its seat 28, the resiliently deformable means 56 may simply be deformed against surfaces which do not move with the valve member. In this way, the valve stem 40 is allowed to move freely within the tube 52, the lower end of the latter telescoping within the tube 36 as the valve member moves away from its seat. This latter movement also compresses the resiliently deformable sleeve 62 within the tube 36 and any air that may be expelled from the sleeve 62 can escape between the exterior surface of the valve and the interior surface of the tube 52. This arrangement prevents the creation of pressure or vacuum conditions as a result of movement between the telescoping tubes 52 and 36. The resiliently deformable member 56 serves to provide a fluid-tight seal between the interior walls of the valve chamber and the valve member itself which isolates the end wall and the valve stem extending outwardly therefrom from any contact with the corrosive material within the valve chamber. This fluid-tight seal is improved as the valve member moves away from its seat to permit entry of corrosive material through the inlet 28.

Figure 5:
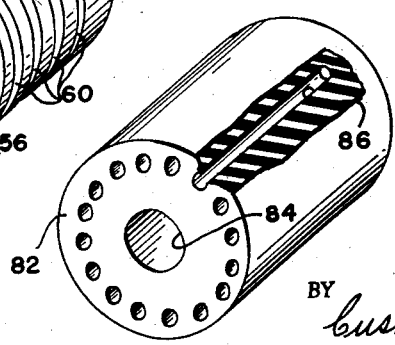
Figure 5 is a view similar to Figure 4 illustrating a modified form of the resiliently deformable member.

It will be understood that the resiliently deformable member may be varied in construction. For example, in Figure 5 there is shown a modified form of a resiliently deformable member, indicated by the reference numeral 82. The member 82 may be of the same cylindrical form as the member 56 providing a central opening 84 extending longitudinally therethrough for receiving the tube 52. Instead of the grooves 60, the member 82 is provided with a plurality of circumferentially spaced openings 86 which extend longitudinally therethrough. These openings may be drilled or otherwise formed in the compressible member.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. In a corrosive resistant valve construction, the combination comprising: means forming a valve body having interior corrosive resistant surfaces defining a valve chamber, an inlet valve seat, and an outlet; a corrosive resistant valve member mounted in said chamber in cooperative relation with respect to said valve seat for movement toward and away from the latter; corrosive resistant resiliently deformable means disposed in said chamber for resiliently urging said valve member into engagement with said valve seat; said valve body forming means also forming an end wall opposite from said valve seat; a valve stem extending through said end wall, said resiliently deformable means engaging between said valve member and end wall so as to be resiliently deformed therebetween in response to movement of said valve member away from said seat; and means for preventing said resiliently deformable means from engaging said stem during the movement of the latter with said valve member so as to enable the stem to move free from contact with said resiliently deformable means, said last mentioned means including a tubular element rigidly secured to said end wall in surrounding relation to said stem and extending completely through said resiliently deformable means in all positions of movement of said valve member.

2. The combination as defined in claim 1 wherein said valve member includes a tubular element arranged to receive an end of said first-mentioned tubular element when said valve member is moved away from said valve seat.

3. The combination as defined in claim 2 wherein a sleeve of deformable material is disposed within said second-mentioned tubular element, said sleeve of deformable material engaging the end of said first-mentioned tubular element.

4. The combination as defined in claim 1 wherein said resiliently deformable means comprises a cylinder of rubber having portions removed from the exterior peripheral surface thereof so as to permit the same to be deformed axially.

5. In a corrosive resistant valve construction, the combination comprising: means forming a valve body having interior corrosive resistant surfaces defining a valve chamber, an inlet valve seat, and an outlet; a corrosive resistant valve member mounted in said chamber in cooperative relation with respect to said valve seat for movement toward and away from the latter; corrosive resistant resiliently deformable means disposed in said chamber for resiliently urging said valve member into engagement with said valve seat; said valve body forming means also forming an end wall opposite from said valve seat; a valve stem extending through said end wall, said resiliently deformable means engaging between said valve member and end wall so as to be resiliently deformed therebetween in response to movement of said valve member away from said seat; and means for preventing said resiliently deformable means from engaging said stem during the movement of the latter with said valve member so as to enable the stem to move free from contact with said resiliently deformable means, said resiliently deformable means comprising a cylinder of rubber having longitudinally extending circumferentially spaced openings extending therethrough for permitting the same to be deformed axially.

6. In a corrosive resistant valve construction, a combination comprising: a valve body defining a cavity having a longitudinally extending inlet port at one end thereof with the other end being open; a corrosive resistant cup-shaped liner member disposed within said cavity, said liner member having an apertured end wall surrounding said inlet port providing a valve seat therefor and a peripheral wall extending from said end wall toward the open end of said cavity; a corrosive resistant valve member mounted in said liner member for movement toward and away from said valve seat; means secured to the open end of said valve body for enclosing said valve member, said means including a corrosive resistant deformable member disposed in engagement with said valve member and operable to resiliently urge the latter toward said seat; and a valve stem extending from said valve member through said valve body enclosure means, said valve body enclosure means also including a sleeve fixed with respect to said valve body and disposed in surrounding relation with said valve stem, said sleeve extending completely through said deformable member so as to prevent the latter from contacting said valve stem.

References Cited in the file of this patent

UNITED STATES PATENTS

| | | |
|---|---|---|
| 1,923,306 | Hagen | Aug. 22, 1933 |
| 1,930,098 | Hossfeld | Oct. 10, 1933 |
| 2,181,900 | Langdon | Dec. 5, 1939 |
| 2,202,735 | Johnson | May 28, 1940 |
| 2,299,079 | Davis | Oct. 20, 1942 |
| 2,639,141 | Gabriel | May 19, 1953 |